(12) United States Patent
Boychuk et al.

(10) Patent No.: US 8,733,732 B2
(45) Date of Patent: May 27, 2014

(54) PRESSURIZED O-RING POLE PIECE SEAL FOR A MANIFOLD

(75) Inventors: Robert John Boychuk, Troy, MI (US); Robert Andrew Dayton, Attica, MI (US); Brian James O'Neil, Richmond, MI (US); Mark William Hildebrandt, Hartland, MI (US)

(73) Assignee: Eaton Corporation, Cleveland, OH (US)

( * ) Notice: Subject to any disclaimer, the term of this patent is extended or adjusted under 35 U.S.C. 154(b) by 294 days.

(21) Appl. No.: 13/110,460

(22) Filed: May 18, 2011

(65) Prior Publication Data

US 2011/0284782 A1    Nov. 24, 2011

Related U.S. Application Data

(60) Provisional application No. 61/347,734, filed on May 24, 2010.

(51) Int. Cl.
*F16K 31/06* (2006.01)

(52) U.S. Cl.
USPC ................................. 251/129.15; 251/900

(58) Field of Classification Search
USPC ........................................ 251/129.15, 900
See application file for complete search history.

(56) References Cited

U.S. PATENT DOCUMENTS

| | | | |
|---|---|---|---|
| 3,082,359 A * | 3/1963 | Mangiafico et al. | 335/261 |
| 3,263,959 A * | 8/1966 | Wisniewski | 251/129.15 |
| 4,074,700 A * | 2/1978 | Engle | 137/625.27 |
| 4,238,110 A | 12/1980 | McCabe | |
| 4,582,294 A * | 4/1986 | Fargo | 251/129.15 |
| 4,753,416 A | 6/1988 | Inagaki et al. | |
| 5,531,422 A | 7/1996 | Ward et al. | |
| 5,579,741 A * | 12/1996 | Cook et al. | 123/516 |
| 5,685,519 A * | 11/1997 | Bircann et al. | 251/129.15 |
| 5,875,922 A * | 3/1999 | Chastine et al. | 222/1 |
| 6,092,784 A * | 7/2000 | Kalfsbeck | 251/129.15 |
| 6,644,265 B2 | 11/2003 | Parker et al. | |
| 7,007,925 B2 | 3/2006 | Nordstrom et al. | |
| 7,452,192 B2 * | 11/2008 | Hirota | 251/129.15 |

(Continued)

FOREIGN PATENT DOCUMENTS

GB        2189010 A    * 10/1987

OTHER PUBLICATIONS

European Patent Office; International Search Report and Written Opinion issued in corresponding PCT application No. PCT/US2011/037739. Date of Mailing: Sep. 20, 2011.

*Primary Examiner* — John Bastianelli
(74) *Attorney, Agent, or Firm* — Dykema Gossett PLLC

(57) ABSTRACT

An assembly comprises a manifold and a valve. The manifold has a portion defining a bore having a first end and a second end. The valve is at least partially disposed within the manifold and includes a coil configured to generate a magnetic field; a bobbin configured to house the coil; a pole piece located near the bobbin; and a housing. The pole piece includes a first end configured for insertion into the bore of the manifold; a circumferentially extending groove located near the first end of the pole piece; an o-ring disposed in the circumferentially extending groove; and a radially outwardly extending flange located near the circumferentially extending groove that is configured to engage both the portion of the manifold defining the first end of the bore and the bobbin. The housing includes a tab configured to fasten the valve to the manifold.

21 Claims, 3 Drawing Sheets

(56) References Cited

U.S. PATENT DOCUMENTS

| | | |
|---|---|---|
| 7,673,597 B2 | 3/2010 | Najmolhoda et al. |
| 2006/0027773 A1 | 2/2006 | Nordstrom et al. |
| 2008/0185546 A1 | 8/2008 | Mills et al. |
| 2008/0272208 A1* | 11/2008 | Anderson et al. ............. 239/302 |
| 2009/0256092 A1 | 10/2009 | Nordstrom et al. |
| 2010/0019186 A1 | 1/2010 | Keller et al. |
| 2010/0095917 A1 | 4/2010 | Najmolhoda et al. |
| 2010/0095918 A1 | 4/2010 | Cecur |

* cited by examiner

PRESSURIZED O-RING POLE PIECE SEAL FOR A MANIFOLD

CROSS-REFERENCE TO RELATED APPLICATIONS

This application claims the benefit of U.S. Provisional Application No. 61/347,734, filed May 24, 2010, which is hereby incorporated by reference as though fully set forth herein.

TECHNICAL FIELD

The present invention relates to an assembly having a solenoid valve, including a solenoid valve having a pole piece with an o-ring.

BACKGROUND

Solenoid valves may be used as oil control valves to provide oil pressure to latching mechanisms used by components of engine assemblies that use variable valve lift technology. Solenoid valves may thus control the flow of motor oil to the cylinder system, which may in turn, control how the cylinder is coupled to the valve train of the engine assembly. Solenoid valves used as oil control valves may open into supply pressure. Motor oil, under a certain pressure, may flow into a supply port of the oil control valve. In a de-energized state, the oil pressure may push on a poppet which may cause an armature to move so as to prevent oil flow into the oil control valve. In an energized state, a predetermined voltage may be applied to a coil, thereby causing a magnetic force to be generated. The magnetic force may cause the armature to move so as to seal off oil flow to the exhaust port and allow oil flow into the control port of the oil control valve. The flow path from the control port of the oil control valve may lead to the lash adjuster which may facilitate latching and unlatching of the engine valve for a specific cylinder. During the de-energized state of the oil control valve, a minimum pressure to the latching mechanism may be maintained. The oil control valve may prevent a high pressure condition in the oil gallery to the latching mechanism by opening to an exhaust port.

A solenoid valve may include a pole piece. The pole piece may be inserted into a manifold in order to seal a hydraulic passage from an oil supply. The pole piece may be pressed to a particular axial position of the manifold (based on preceding measurements) in order to optimize the performance of the solenoid valve. A metal-to-metal seal may be used between the pole piece and the manifold. In some circumstances, it may be advantageous to employ a more robust seal between the pole piece and the manifold. It may also be advantageous to make additional modifications to the assembly to improve manufacturability.

SUMMARY

An assembly is provided that may include a manifold and a valve. The manifold may have a portion defining a bore having a first end and a second end. The valve may be at least partially disposed within the manifold. The valve may include a coil configured to generate a magnetic field; a bobbin configured to house the coil; a pole piece located near the bobbin; and a housing configured to house the coil, the bobbin, and the pole piece. The pole piece may include a first end configured for insertion into the bore of the manifold; a circumferentially extending groove located near the first end of the pole piece; an o-ring disposed in the circumferentially extending groove; and a radially outwardly extending flange located near the circumferentially extending groove that is configured to engage both the portion of the manifold defining the first end of the bore and the bobbin. The o-ring may comprise a fluorocarbon elastomer in accordance with an embodiment of the invention. The housing may include a tab configured to fasten the valve to the manifold.

The valve may further comprise a top flux collector and a bottom flux collector, wherein the bobbin and the coil are disposed between the top flux collector and the bottom flux collector. The bottom flux collector may be cast with the manifold. The tab may be configured to engage the bottom flux collector. For example and without limitation, the tab may be crimped over the bottom flux collector.

There may be a gap between the bobbin and the bottom flux collector. The valve may further comprises an armature, wherein the armature is at least partially disposed within the bore of the manifold and is configured for movement when a magnetic field is generated by the coil. There may be a working air gap between the armature and the pole piece. The working air gap may be between about 0.90 mm and about 1.05 mm.

The manifold may define a supply port configured to be in fluid communication with an engine, wherein fluid is configured to flow from the supply port to a supply gallery. The manifold may further define a control port configured to be in fluid communication with an engine, wherein fluid is configured to flow from the supply gallery to the control port. The manifold may further define an exhaust port configured to be in fluid communication with an engine. The manifold may further define a bypass passage configured to allow fluid to flow directly from the supply port or supply gallery to the exhaust port. The assembly may further comprise an exhaust regulator configured to control oil pressure within the exhaust port.

The use of a radially outwardly extending flange on the first end of the pole piece may improve manufacturability of the assembly by allowing for a positive "stop" on the manifold as opposed to having to assemble to an axial position of the manifold based on preceding measurements. The pole piece and mating components may be toleranced so that a resultant working air gap is within the functional limits of the valve assembly. The use of an o-ring on the first end of the pole piece may allow for a more robust hydraulic seal between the pole piece and the manifold. Because the use of the o-ring on the first end of the manifold may eliminate friction (e.g., from the interference fit between the metal-to-metal contact of the pole piece and manifold) that would otherwise function as a positive means to prevent the pole piece from moving (e.g., backing out) during operation, it may be advantageous to modify the assembly in a manner so as to improve retention of the pole piece. For example, the housing for the coil, bobbin, and pole piece may include at least one housing tab that may be configured to be placed into engagement with the manifold so as to hold the coil, bobbin, and pole piece in place.

BRIEF DESCRIPTION OF THE DRAWINGS

Embodiments of the invention will now be described, by way of example, with reference to the accompanying drawings, wherein.

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as embodied by the appended claims. For example, the invention may include elements described in connection with the solenoid valve module set forth in co-owned U.S. Patent Application Publication No. 2010/0089347, which is hereby incorporated by reference.

Figure 1:
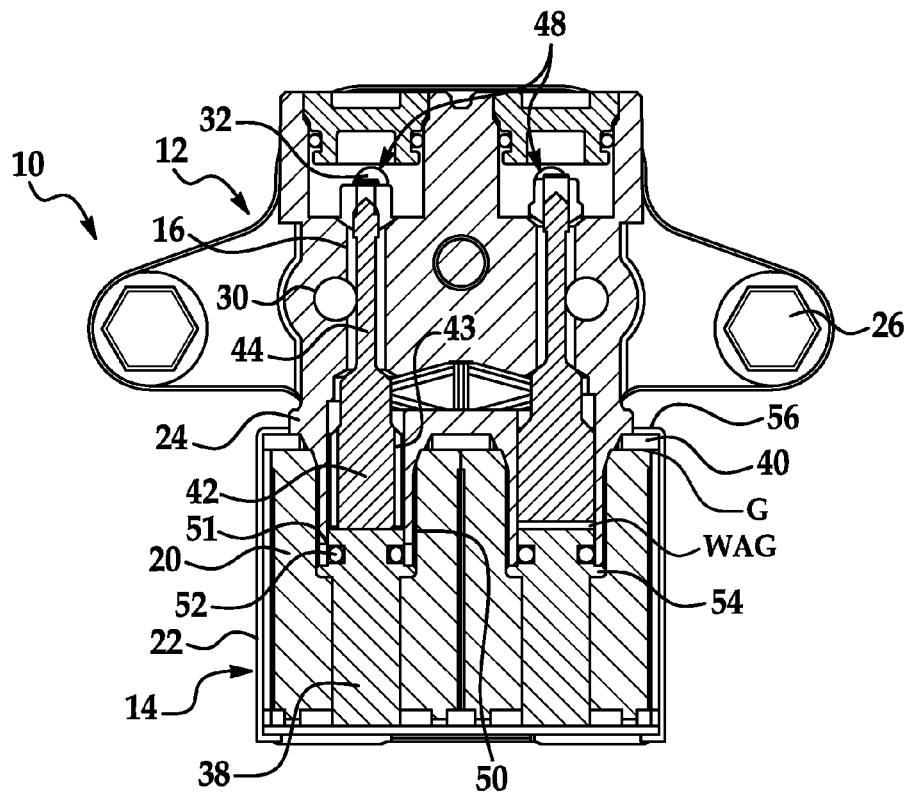
FIG. 1 is a cross-sectional front view of an assembly including a solenoid valve in accordance with an embodiment of the invention.

Referring now to FIG. 1, an assembly 10 including a solenoid valve 12 is generally illustrated. The assembly 10 may be installed on or in an engine in accordance with an embodiment of the invention. The assembly 10 may be used with a hydraulic control system used to control oil under pressure that may be used to activate and/or deactivate elements in engine valve systems; however, the assembly 10 may also be used in connection with various other systems in other embodiments. Although the assembly is described as including a solenoid valve 12, it should be understood that the assembly 10 may include more than one solenoid valve in accordance with other embodiments of the invention. For example, as generally illustrated, the assembly 10 may include two or more solenoid valves. In those embodiments of the invention including multiple solenoid valves, the structure and function of each of the multiple solenoid valves may be generally identical.

Figure 2:
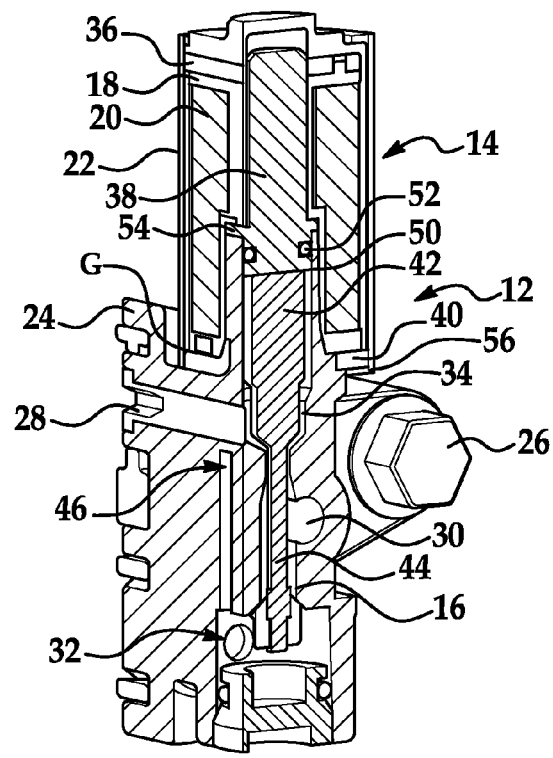
FIG. 2 is a schematic perspective cross-sectional view of an assembly including a solenoid valve in accordance with an embodiment of the invention.

Referring now to FIGS. 1-2 in particular, the solenoid valve 12 may include a solenoid portion 14 and a valve body 16. The solenoid portion 14 and the valve body 16 may operate in a typical manner to provide fluid control as is known in the art. The solenoid portion 14 of the solenoid valve 12 may include a bobbin 18 as best shown in FIG. 2. Bobbin 18 may be configured to house coil 20. Coil 20 may be configured to power the solenoid valve 12. In particular, the coil 20 may be configured to generate a magnetic field. The solenoid valve 12 may also include a housing 22. Housing 22 may be configured to house the bobbin 18, coil 20, and other elements of the solenoid portion 14 of the solenoid valve 12.

Referring now to FIGS. 1-4, the assembly 10 may further include a manifold 24. Manifold 24 may be configured to house the valve body 16 of the solenoid valve 12. The housing 22 and the manifold 24 may be connected to one another. The manifold 24 may define a plurality of attachment apertures, and a plurality of fasteners 26 may extend through the plurality of attachment apertures in order to secure the assembly 10 to an engine (not shown). There may be any number of attachment apertures and fasteners depending on the configuration of the engine and the assembly 10.

Referring now to FIG. 2 in particular, the manifold 24 may also define a supply port 28, a control port 30, and an exhaust port 32. Corresponding ports may be formed in the engine to direct fluid from the assembly 10 to the required location within the engine (e.g., to various elements such as valve lifters, lash adjusters, etc.). The supply port 28 may extend to a supply gallery 34, which is a supply gallery 34 for the solenoid valve 12. The supply gallery 34 may be a common supply gallery in those embodiments including multiple solenoid valves. The pressure within the supply gallery 34 may be sufficient to maintain independent operation of multiple solenoid valves in those embodiments including multiple solenoid valves.

The solenoid valve 12 may have a flux circuit formed by a top flux collector 36, a pole piece 38, a bottom flux collector 40, and an armature 42. The armature 42 may be disposed in an armature cavity 43. The armature 42 may be configured for movement when a magnetic field is generated by the coil 20. The top flux collector 36, the pole piece 38, the bottom flux collector 40, and the armature 42 may be assembled within the housing 22. The geometry of the pole piece 38 may be optimized for transferring magnetic flux. The gap G between the bobbin 18 and the bottom flux collector 40 may, for example, be about 0.20 mm in an embodiment of the invention. The gap G may be at least about 0.20 mm in an embodiment of the invention. Accordingly, the gap G may vary in accordance with different embodiments of the invention. As described in more detail herein, the gap G may be configured so as to ensure that the bobbin 18 will engage a flange 54 of the pole piece 38 as the bobbin 18 is inserted into the assembly 10, rather than the flux collector 40. By energizing or de-energizing the coil 20, the armature 42 may be acted upon by the flux to shift a valve stem 44 within the valve body 16. In accordance with an embodiment of the invention, the working air gap (WAG) between the armature 42 and the pole piece 38 may, for example, range from about 0.80 to about 1.10 mm. Although this particular range for the working air gap WAG is mentioned in detail, the working air gap WAG may be greater or smaller in accordance with other embodiments of the invention.

Oil may enter the assembly 10 through the supply port 28 and flow through the supply gallery 34. When the solenoid valve 12 is moved to a certain position (e.g., coil 20 is energized and armature 42 is moved toward pole piece 38), oil may flow from the supply gallery 34 to the control port 30 and the exhaust port 32 may be closed. Operation of the solenoid valve 12 may vary pressure within the control port 30. Oil may also flow to various engine components. The solenoid valve 12 may also include a bypass passage 46. Bypass passage 46 may be configured to allow a portion of the oil flow to flow directly from the supply port 28 or supply gallery 34 to the exhaust port 32. The bypass passage 46 may be defined by the solenoid housing 24 and may be configured to assist in efficient operation of the solenoid valve 12. When the solenoid valve 12 is energized, the assembly 10 may be in low lift mode. The supply pressure to the supply gallery 34 may be closed. A small amount of pressure may be maintained in the supply gallery 34 through bypass passage 46. When the solenoid valve 12 is de-energized, the assembly 10 may be in high lift mode. A regulated supply pressure is applied to the supply gallery 34. When coil 20 is de-energized, the armature 42 is separated from pole piece 38 by the working air gap.

Referring back to FIG. 1, an exhaust regulator 48 may be configured to control the pressure of oil within the exhaust port 32. Oil from the supply port 28 may be vented into the exhaust port 32 through the bypass passage 46. The exhaust regulator 48 may be configured to act as a pressure relief valve to control the pressure of oil in the exhaust port 32. Additionally, when the coil 20 is de-energized, the oil from the exhaust port 32 may flow back through the control port 30 to feed the various engine components.

In accordance with an embodiment of the invention, at least a portion of the pole piece 38 (e.g., a first end) may be configured for insertion into a bore 50 in manifold 24. At least a portion of the manifold 24 may, thus, define the bore 50. The bore 50 may have a first end and a second opposing end. The interference/clearance fit between the pole piece 38 and the manifold 24 may, for example, be in the range of about 0.04 to about 0.16 mm in accordance with an embodiment of the invention. Although this particular range for the interference/clearance fit between the pole piece 38 and the manifold 24 is mentioned in detail, the interference/clearance fit between the pole piece 38 and the manifold 24 may be greater or smaller in accordance with other embodiments of the invention.

Figure 3A:
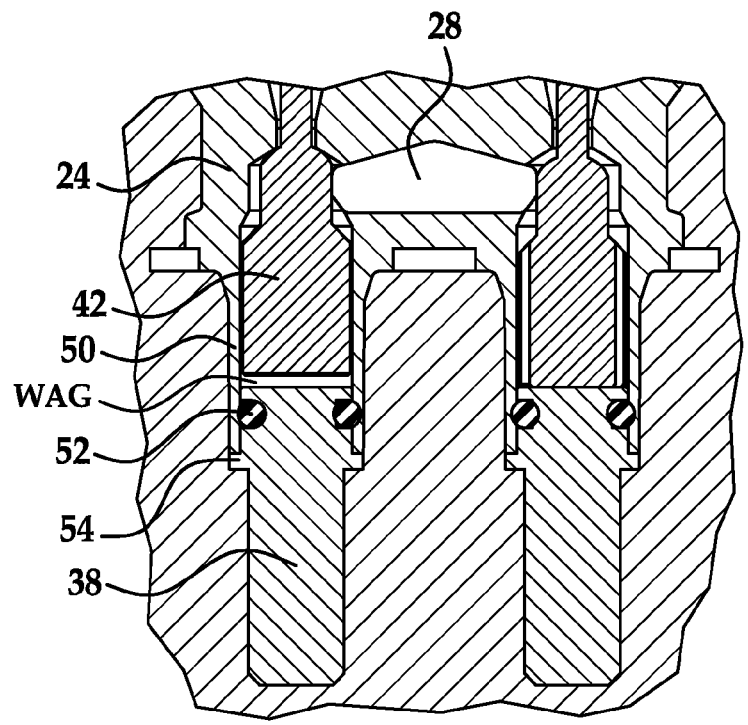
FIG. 3A is a partial cross-sectional front view of an assembly including a solenoid valve in accordance with an embodiment of the invention.
Figure 3B:
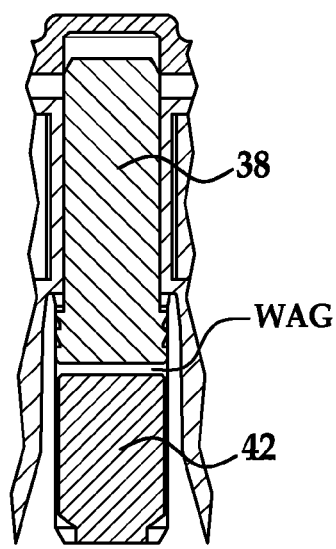
FIG. 3B is a partial cross-sectional view of a pole piece in a manifold in accordance with a metal to metal seal.
Figure 3C:
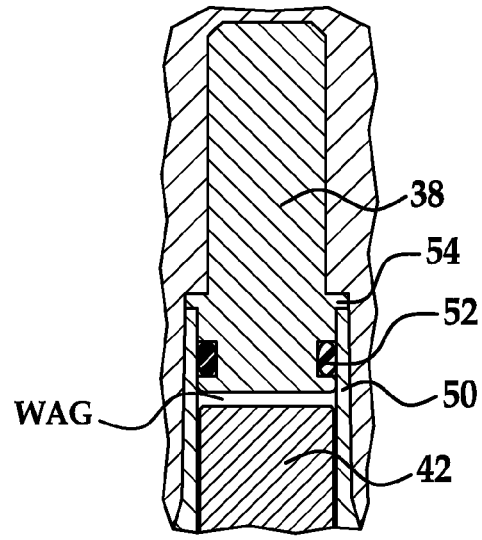
FIG. 3C is a partial cross-sectional view of a pole piece in a manifold in accordance with an embodiment of the invention.
Figure 4:
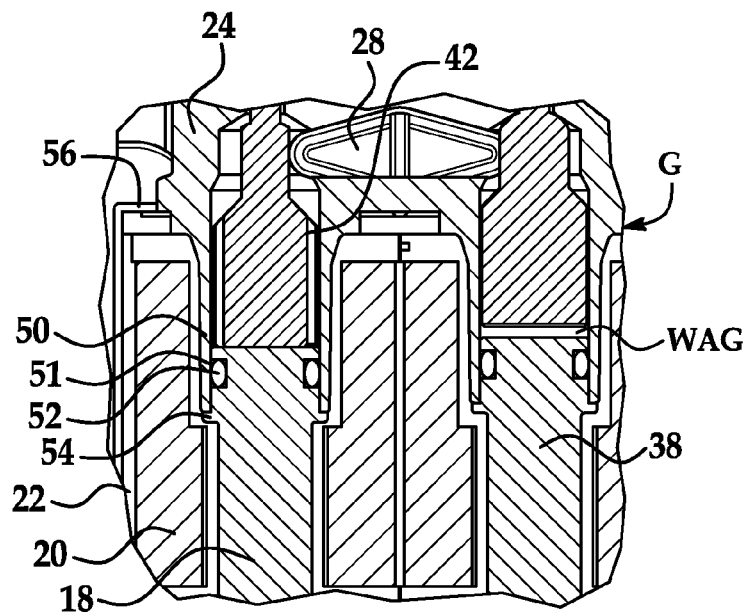
FIG. 4 is a partial cross-sectional front view of an assembly including a solenoid valve in accordance with an embodiment of the invention.

The first end of pole piece 38 may include a groove 51. Groove 51 may extend circumferentially around the first end of the pole piece 38. An o-ring 52 may be disposed within the circumferentially extending groove 51. The o-ring 52 may be configured to engage a side of the bore 50 in the manifold 24. For example and without limitation, the o-ring 52 may comprise a fluorocarbon elastomer o-ring, for example as sold by DuPont under the brand name VITON®. Although a fluorocarbon elastomer is mentioned in detail in an embodiment of the invention, the o-ring may comprise any number of other various materials or other pre-formed packaging in accordance with various other embodiments of the invention. In accordance with an embodiment of the invention may have about 23-40% squeeze. Although this particular range for o-ring squeeze is mentioned, the percentage of o-ring squeeze may be greater or smaller in accordance with other embodiments of the invention. The o-ring 52 may be configured to provide a robust hydraulic seal between the pole piece 38 and the manifold 24. The o-ring 52 may provide an improved seal between the pole piece 38 and the manifold 24 as compared to a design with a metal to metal seal as generally illustrated in FIG. 3B.

The pole piece 38 may be located near the bobbin 18. The pole piece 38 may further include a radially outwardly extending flange 54. The flange 54 may be located near the groove 51 in accordance with an embodiment of the invention. The flange 54 may be configured to engage both the portion of the manifold 24 defining the first end of the bore 50 and the bobbin 18. In particular, as the bobbin 18 is inserted into the assembly 10, at least a portion of the bobbin 18 may engage the flange 54, rather than engaging the bottom flux collector 40. The flange 54 may be configured to improve manufacturability by allowing for assembly of the pole piece 38 to a positive "stop" on the manifold 24 (i.e., not requiring assembly to a predetermined axial position based on previously obtained measurements).

Figure 5:
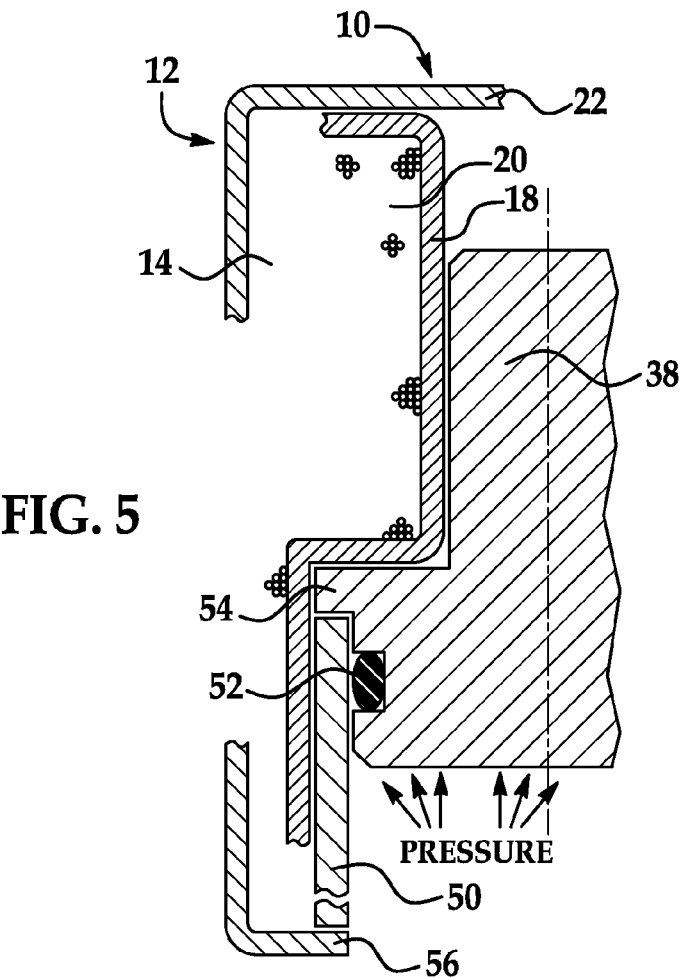
FIG. 5 is a partial cross-sectional front view of an assembly including a solenoid valve in accordance with an embodiment of the invention.

Referring now to FIGS. 1, 2, and 5, in particular, the housing 22 may include a tab 56. The tab 56 may be configured to engage the bottom flux collector 40 which is cast with the manifold 24. In particular, the tab 56 may be configured to be placed into engagement (e.g., bent and crimped) with the bottom flux collector 40 which is cast with the manifold 24 so as to connect the valve assembly 10 to the manifold 24. The tab 56 may therefore be configured to hold the coil 20, bobbin 18, and pole piece 38 in place and generally prevent movement of the pole piece 38. The configuration and dimensions of the pole piece 38, manifold 24, and armature 42 are configured to maintain a specified magnetic air gap (e.g., working air gap (WAG)) and optimize response time and performance of the solenoid valve 12. The magnetic air gap (e.g., working air gap (WAG)) between the pole piece 38 and the armature 42 may be employed to impart magnetic strength. The configuration of the inventive assembly 10 may provide a low cost solution to manufacture the various components and assembly. The inventive assembly 10 may also provide for a robustness of, for example, at least 3 million cycles with minimal change in the calibrated position.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims. It is intended that the scope of the invention be defined by the claims appended hereto and their equivalents.

What is claimed:

1. An assembly, comprising:
   a manifold having a portion defining a bore, wherein the bore has a first end and a second end;
   a valve disposed at least partially within the manifold, the valve including:
      a coil configured to generate a magnetic field;
      a bobbin configured to house the coil;
      a pole piece located near the bobbin, the pole piece including:
         a first end configured for insertion into the bore of the manifold;
         a circumferentially extending groove located near the first end of the pole piece;
         an o-ring disposed in the circumferentially extending groove; and
         a radially outwardly extending flange located near the circumferentially extending groove, wherein the radially outwardly extending flange engages an axial surface of the portion of the manifold defining the first end of the bore and the bobbin engages an axial surface of the radially outwardly extending flange to axially position the pole piece and the bobbin on the manifold; and
   a housing configured to house the coil, the bobbin, and the pole piece, wherein the housing includes a tab configured to fasten the valve to the manifold.

2. The assembly of claim 1, wherein the valve further comprises a top flux collector and a bottom flux collector and wherein the bobbin and the coil are disposed between the top flux collector and the bottom flux collector.

3. The assembly of claim 2, wherein there is a gap between the bobbin and the bottom flux collector.

4. The assembly of claim 1, wherein the valve further comprises an armature, wherein the armature is at least partially disposed within the bore of the manifold and is configured for movement when a magnetic field is generated by the coil.

5. The assembly of claim 4, wherein there is a working air gap between the armature and the pole piece.

6. The assembly of claim 5, wherein the working air gap is between about 0.80 mm and about 1.10 mm.

7. The assembly of claim 1, wherein the manifold defines a supply port configured to be in fluid communication with an engine, wherein fluid is configured to flow from the supply port to a supply gallery.

8. The assembly of claim 7, wherein the manifold further defines a control port configured to be in fluid communication with an engine and wherein fluid is configured to flow from the supply gallery to the control port.

9. The assembly of claim 8, wherein the manifold further defines an exhaust port configured to be in fluid communication with an engine.

10. The assembly of claim 9, wherein the manifold further defines a bypass passage configured to allow fluid to flow directly from the supply port or supply gallery to the exhaust port.

11. The assembly of claim 10, further comprising an exhaust regulator configured to control oil pressure within the exhaust port.

12. The assembly of claim 1, wherein the o-ring comprises a fluorocarbon elastomer.

13. The assembly of claim 2, wherein the tab is configured to engage the bottom flux collector.

14. The assembly of claim 13, wherein the bottom flux collector is cast with the manifold.

15. The assembly of claim 14, wherein the tab is crimped over the bottom flux collector.

16. An assembly, comprising:
a manifold having a portion defining a bore, wherein the bore has a first end and a second end;
a valve disposed at least partially within the manifold, the valve including:
a coil configured to generate a magnetic field;
a bobbin configured to house the coil;
a pole piece located near the bobbin, the pole piece including:
a first end configured for insertion into the bore of the manifold;
a circumferentially extending groove located near the first end of the pole piece;
an o-ring disposed in the circumferentially extending groove; and
a radially outwardly extending flange located near the circumferentially extending groove, wherein the radially outwardly extending flange engages an axial surface of the portion of the manifold defining the first end of the bore and the bobbin engages an axial surface of the radially outwardly extending flange to axially position the pole piece and the bobbin on the manifold;
a top flux collector;
a bottom flux collector, wherein the coil and the bobbin are disposed between the top flux collector and the bottom flux collector and there is a gap between the bobbin and the bottom flux collector; and
an armature at least partially disposed within the bore of the manifold and configured for movement when a magnetic field is generated by the coil; and
a housing configured to house the coil, the bobbin, and the pole piece, wherein the housing includes a tab crimped over the bottom flux collector to fasten the valve to the manifold.

17. The assembly of claim 1, wherein the radially outwardly extending flange of the pole piece is axially engaged between the portion of the manifold defining the first end of the bore and a portion of the bobbin.

18. The assembly of claim 1, wherein the bobbin is configured to engage the radially outwardly extending flange of the pole piece so as to provide a gap between the bobbin and a bottom flux collector that is provided on the manifold.

19. The assembly of claim 16, wherein the radially outwardly extending flange of the pole piece is axially engaged between the portion of the manifold defining the first end of the bore and a portion of the bobbin.

20. The assembly of claim 16, wherein the bobbin is configured to engage the radially outwardly extending flange of the pole piece so as to provide the gap between the bobbin and the bottom flux collector.

21. The assembly of claim 16, wherein the o-ring comprises a fluorocarbon elastomer and the bottom flux collector is cast with the manifold.

* * * * *